J. S. Miles,
Ornamenting Glass.
Nº 21,896.                    Patented Oct. 26, 1858.
Fig: 4.
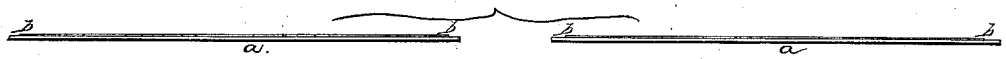
Fig: 3.
Fig: 1.
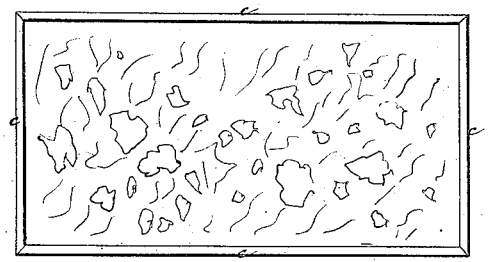
Fig: 2.
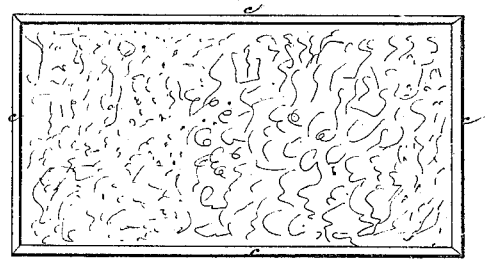

UNITED STATES PATENT OFFICE.

JASPER S. MILES, OF ANN ARBOR, MICHIGAN.

ORNAMENTING GLASS.

Specification of Letters Patent No. 21,896, dated October 26, 1858.

*To all whom it may concern:*

Be it known that I, JASPER S. MILES, of Ann Arbor, in the county of Washtenaw and State of Michigan, have invented a new and useful Article of Manufacture, which I denominate Coral Glass, to be used for windows, side lights, door-panels, mantel-pieces, lanterns, and other purposes; and I do hereby declare that the following is a full, clear, and exact description of the same, reference being had to the accompanying drawings, forming part of this specification, in which—

Figure 1, is a face view of the coral glass as it appears on the side on which the light falls. Fig. 2, is a face view of the same as it appears when between the observer and the light. Fig. 3, is a section of the same. Fig. 4, gives an edge view of the pieces of glass illustrating the manufacture of the coral glass.

Similar letters of reference indicate corresponding parts in the several figures.

The coral glass is produced by applying paint to one of the surfaces of each of two plates of glass and treating the said paint and plates in the manner hereinafter specified.

The colors to be used for the paint may be various but I propose generally to use zinc white, vermilion, Paris green and ultra-marine blue. These are to be ground very fine and mixed for use with equal quantities of boiled linseed oil and Demar varnish much thicker than for common painting viz: of about the consistence of cold tar. The glass may be common window glass.

The mode of applying the paint and subsequent treatment are as follows: I take two plates of glass of equal size and lay them upon a table or other smooth flat surface and dab the colors on their upper surfaces with a sponge or paint brush, first applying the white so as to cover or nearly cover the surfaces and afterward, the other colors, in patches upon or among the white as shown in Fig. 4 where as in Fig. 3 *a*, *a*, represent the plates and *b*, *b*, the paint, the proportions of the several colors being varied according to the appearance desired. I then take up one plate and turn it over and place it upon the other so as to bring the two painted surfaces together, as shown in Fig. 3, and press them firmly together with the hands, at the same time moving the upper one about on the lower one to a slight extent to cause the several colors to become somewhat blended together, and then separate them by pulling them directly apart. The pulling them apart produces, on both plates a distribution of the paint in similar tree coral like figures such as are shown in Fig. 2. The pressing of the plates together produces the variegated marble like appearance shown in Fig. 1. I then allow them to dry separately, and after they are dry place their painted surfaces together in the same relative positions which they occupied before their separation so as to bring together the corresponding portions of tree-coral-like configurations on both plates and in this condition fasten them together by strips of paper, pasted, gummed, glued or otherwise secured along their edges in such manner as to lap slightly over their outer faces. The coral glass is now complete and presents on both sides alike the appearance of a solid substance highly polished, semi-transparent and beautifully variegated and grained and may be framed and applied to the purposes hereinabove specified and to many other useful and ornamental purposes. The simple variegated appearance represented in Fig. 1. is most conspicuous on the side which is toward the light but the tree coral-like distribution of the coloring matters represented in Fig. 2, from which the manufacture derives its name is only visible or only very perceptibly so when the glass, is between the observer and the light.

I do not claim the mere ornamentation of glass by the application on one side of it of coloring matters to produce a variegated appearance as I am aware that tortoise shell and other substances have been imitated in this way. I am not however aware of the existence of any method of ornamenting glass which produces the same variegation and tree-coral-like distribution of colors as there is in my coral glass, which I regard as a new manufacture, and I therefore claim as my invention and desire to secure by Letters Patent—

The said manufacture produced by the combination of two plates of glass with coloring matters by a process like that herein specified.

JASPER S. MILES.

Witnesses:
THOMAS C. CUTLER,
C. H. VANCLEVE.